(12) United States Patent
Smith et al.

(10) Patent No.: US 7,960,862 B2
(45) Date of Patent: Jun. 14, 2011

(54) METHOD AND SYSTEM FOR HIGH-RELIABILITY POWER SWITCHING

(75) Inventors: Michael V. Smith, Austin, TX (US); Jason Cohen, Austin, TX (US); Gerard L. Cullen, Austin, TX (US)

(73) Assignee: Geist Manufacturing, Inc., Lincoln, NE (US)

( * ) Notice: Subject to any disclaimer, the term of this patent is extended or adjusted under 35 U.S.C. 154(b) by 281 days.

(21) Appl. No.: 12/288,509

(22) Filed: Oct. 21, 2008

(65) Prior Publication Data

US 2010/0096933 A1  Apr. 22, 2010

(51) Int. Cl.
*H02J 9/00* (2006.01)
(52) U.S. Cl. .......................................................... 307/64
(58) Field of Classification Search .................. 307/125, 307/64, 65
See application file for complete search history.

(56) References Cited

U.S. PATENT DOCUMENTS

| | | | |
|---|---|---|---|
| 7,265,458 B2* | 9/2007 | Edelen et al. ................... | 307/65 |
| 2006/0245359 A1* | 11/2006 | Hosein .......................... | 370/235 |
| 2007/0216229 A1* | 9/2007 | Johnson et al. ................. | 307/86 |

* cited by examiner

*Primary Examiner* — Michael Rutland Wallis
(74) *Attorney, Agent, or Firm* — Suiter Swantz pc llo (57) ABSTRACT

A method for high-reliability power switching may comprise: (a) transferring possession of a token to first control logic controlling a first triode for alternating current (TRIAC), the TRIAC operably coupled to a first power source; (b) applying a voltage to a gate of the first TRIAC according to the possession of the token; (c) detecting a violation of a power source parameter; (d) transferring possession of the token to second control logic controlling a second TRIAC, the second TRIAC operably coupled to a second power source; (e) removing the voltage from the gate of the first TRIAC; and (f) applying a voltage to a gate of the second TRIAC.

19 Claims, 14 Drawing Sheets

METHOD AND SYSTEM FOR HIGH-RELIABILITY POWER SWITCHING

BACKGROUND

Many installations of critical electronic devices are powered by two or more separate sources of electric power. Traditionally, an electromechanical relay has been used as a simple "either-or" mechanism that prevents both power sources to be selected simultaneously. A typical electromechanical relay operates slowly and can take up to 50 milliseconds to change power sources.

Recent developments in electronic devices, particularly computer servers, now require much faster switching times than relays can provide. To meet the increased speed requirement solid-state (transistor-based) relays are used. These switches have 12 millisecond switching times.

Such switches may include triodes for alternating current (TRIAC). TRIACs are controlled by applying a voltage to a "gate" connection. However, TRIACs lack any inherent self-locking mechanisms to preventing multiple TRIACs regulating multiple power sources which are routed to a single load from being simultaneously enabled.

If multiple TRIACs coupled to dissimilar power sources are enabled simultaneously for a given load, the circuit may be immediately disconnected by the circuit breakers. Wiring and/or equipment damage may result from this inadvertent switching.

As such, it may be desirable to provide a method and system for high-reliability switching for power transfer.

SUMMARY

The present disclosure is directed to systems and methods for high-reliability power switching.

A method for high-reliability power switching may comprise: (a) transferring possession of a token to first control logic controlling a first triode for alternating current (TRIAC), the TRIAC operably coupled to a first power source; (b) applying a voltage to a gate of the first TRIAC according to the possession of the token; (c) detecting a violation of a power source parameter; (d) transferring possession of the token to second control logic controlling a second TRIAC, the second TRIAC operably coupled to a second power source; (e) removing the voltage from the gate of the first TRIAC; and (f) applying a voltage to a gate of the second TRIAC.

A system for high-reliability power switching may comprise: (a) means for transferring possession of a token to first control logic controlling a first triode for alternating current (TRIAC), the TRIAC operably coupled to a first power source; (b) means for applying a voltage to a gate of the first TRIAC according to the possession of the token; (c) means for detecting a violation of a power source parameter; (d) means for transferring possession of the token to second control logic controlling a second TRIAC, the second TRIAC operably coupled to a second power source; (e) means for removing the voltage from the gate of the first TRIAC; and (f) means for applying a voltage to a gate of the second TRIAC.

It is to be understood that both the foregoing general description and the following detailed description are exemplary and explanatory only and are not necessarily restrictive of the claims. The accompanying drawings, which are incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
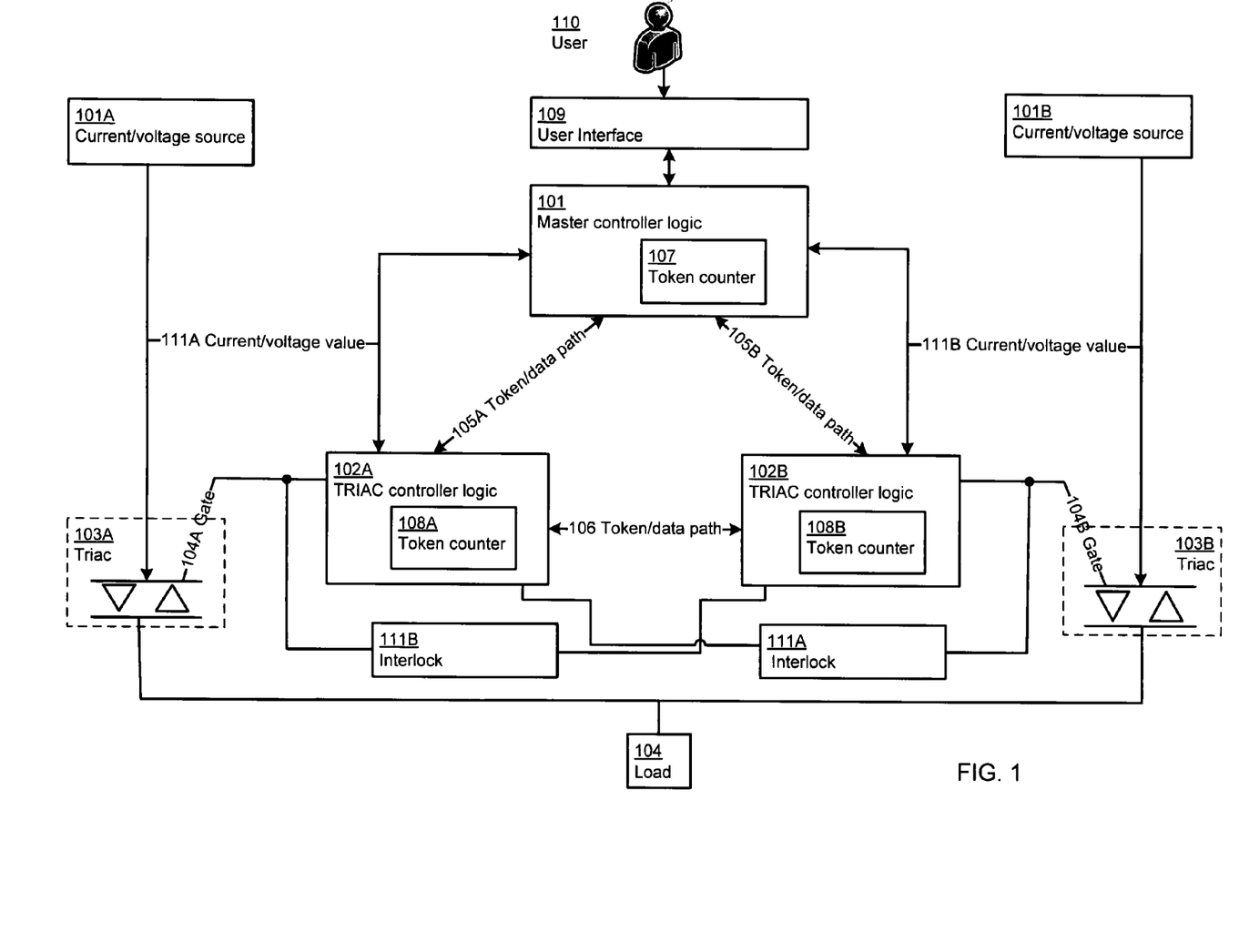
FIG. 1 illustrates a system for high-reliability power switching.

Referring to FIG. 1, a power switching system 100 may comprise a master controller logic 101, first triode for alternating current (TRIAC) controller logic 102A operably coupled to a first TRIAC 103A, and second TRIAC controller logic 102B operably coupled to a second TRIAC 103B. Although the master controller logic 101, first TRIAC controller logic 102A and second TRIAC controller logic 102B are shown as distinct components, they may be provided as a single system or as parts of other distributed systems or other electronics associated with power switching system 100.

The first TRIAC controller logic 102A may provide a gate signal 104A to the first TRIAC 103A so as to enable the first TRIAC 103A to pass a current/voltage from a first current/voltage source 101A to a load 104. Similarly, the second TRIAC controller logic 102B may provide a gate signal 104B to the second TRIAC 103B so as to enable the second TRIAC 103B to pass a current/voltage from a second current/voltage source 101B to the load 104. Such a configuration may provide a mechanism for redundant power sourcing for the load 104. While FIG. 1 depicts two TRIACs 103 respectively coupled to two current/voltage sources 101, it will be evident from the descriptions provided herein that the present invention is extensible to any number of TRIACs 103 regulating a corresponding number of current/voltage sources 101, thereby providing an unlimited degree power redundancy.

The master controller logic 101 may be operably coupled to a communications network, such as the internet, by a user interface 109. A user 110 may access the master controller logic 101 via user interface 109 (e.g. a web server implementing a graphical user interface) so as to provide control data to the master controller logic 101.

Figure 2:
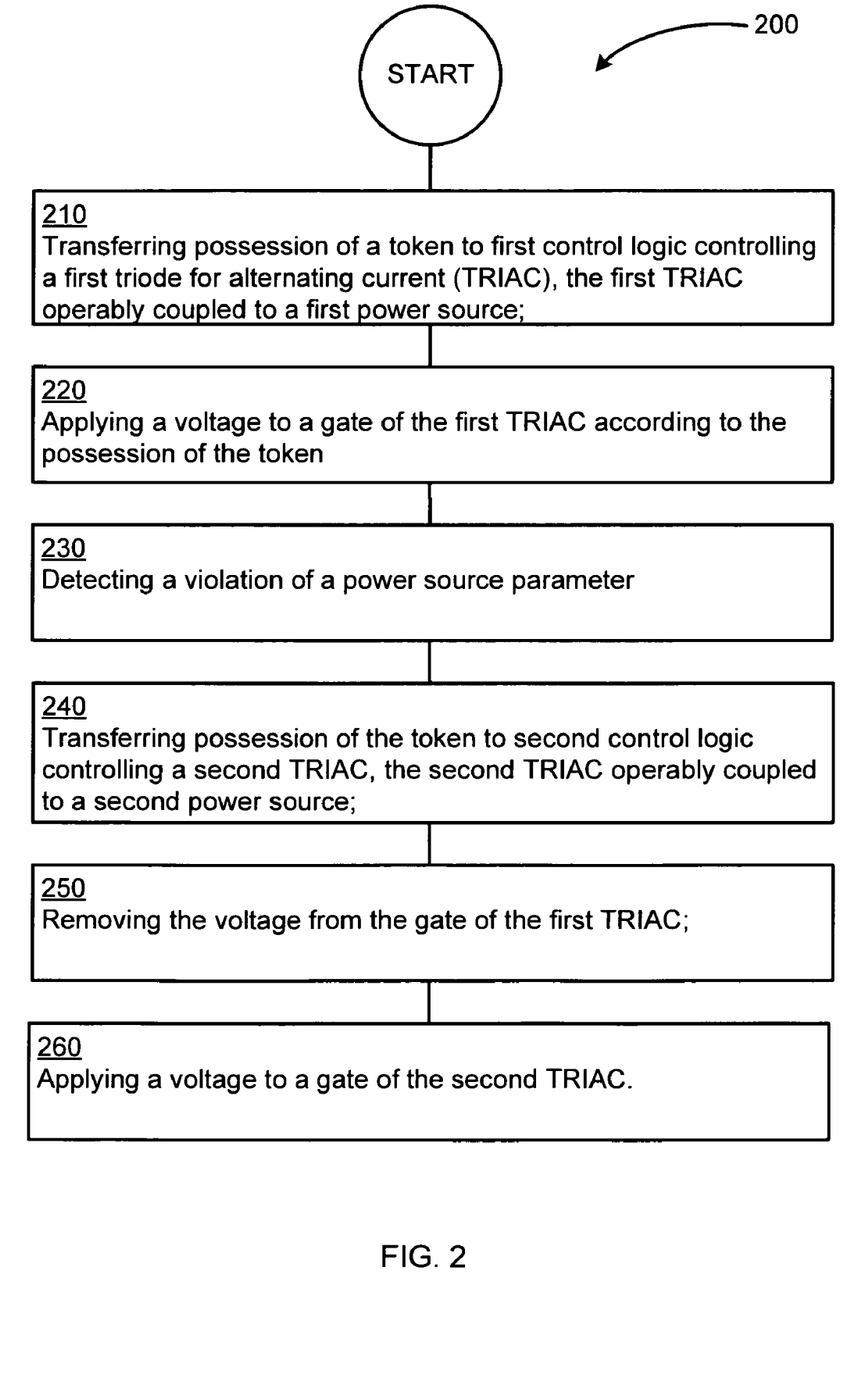
FIG. 2 illustrates operations of a method for high-reliability power switching.

FIG. 2 illustrates an operational flow 200 representing example operations related to high-reliability power switching. In FIG. 2 and in following figures that include various examples of operational flows, discussion and explanation may be provided with respect to the above-described examples of FIG. 1, and/or with respect to other examples and contexts. However, it should be understood that the operational flows may be executed in a number of other environments and contexts, and/or in modified versions of FIG. 1. Also, although the various operational flows are presented in the sequence(s) illustrated, it should be understood that the various operations may be performed in other orders than those which are illustrated, or may be performed concurrently.

After a start operation, operation 210 depicts transferring possession of a token to first control logic controlling a first TRIAC operably coupled to a first power source. For example, as shown in FIG. 1, the master controller logic 101 may pass a token to the first TRIAC controller logic 102A via a token/data path 105A.

Operation 220 depicts applying a voltage to a gate of the first TRIAC according to the possession of the token. For example, as shown in FIG. 1, as the current holder of the token, the first TRIAC controller logic 102A is the only controller authorized to enable its associated first TRIAC 103A. The first TRIAC controller logic 102A may apply a gate signal 104A to the first TRIAC 103A thereby enabling the first TRIAC 103A as a conductor and allowing the current/voltage from the first current/voltage source 101A to pass through to the load 104.

Operation 230 depicts detecting a violation of a power source parameter. For example, the master controller logic 101 may maintain power source parameters governing the allowable electrical properties (e.g. allowable threshold values for voltage, current, frequency, phase, etc.) for the load 104. These parameters may be provided to the first TRIAC controller logic 102A via the token/data path 105A. The first TRIAC controller logic 102A may receive the power source parameters from the master controller logic 101 and compare them to the present current/voltage value 111A for the first current/voltage source 101 A. It may be the case that the current/voltage value 111A for the first current/voltage source 101A violates one or more of the power source parameters and is providing a sub-optimal signal to the load 104.

Operation 240 depicts transferring possession of the token to second control logic controlling a second TRIAC, the second TRIAC operably coupled to a second power source. For example, as shown in FIG. 1, the first TRIAC controller logic 102A may pass the token to the second TRIAC controller logic 102B via token/data path 106.

Operation 250 depicts removing the voltage from the gate of the first TRIAC. For example, as shown in FIG. 1, when the token is transferred to the second TRIAC controller logic 102B, the first TRIAC controller logic 102A is no longer authorized to enable is first TRIAC 103A. As such, the first TRIAC controller logic 102A may remove the voltage from the gate signal 104A for the first TRIAC 103A thereby disabling its ability to pass current or voltage from the first current/voltage source 101A to the load 104.

Operation 260 depicts applying a voltage to a gate of the second TRIAC. For example, as shown in FIG. 1, after receiving the token from the first TRIAC controller logic 102A, the second TRIAC controller logic 102B is the only controller authorized to enable its associated second TRIAC 103B. The second TRIAC controller logic 102B may apply a gate signal 104B to the second TRIAC 103B thereby enabling the second TRIAC 103B as a conductor and allowing the current/voltage from the second current/voltage source 101B to pass through to the load 104.

Figure 3:
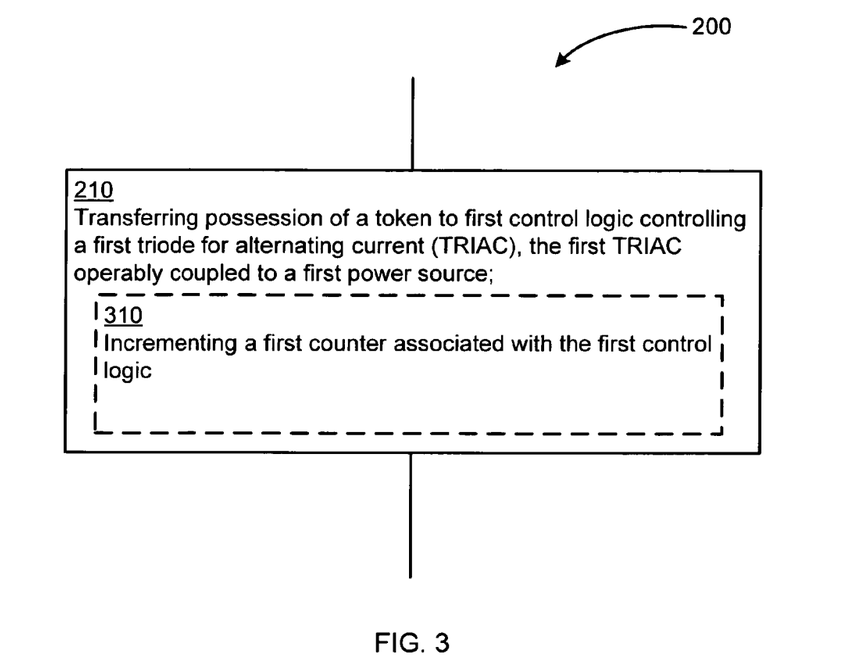
FIG. 3 illustrates operations of a method for high-reliability power switching.

Referring to FIG. 3, operation 210 of operational flow 200 may include one or more operations, such as operation 310. Operation 310 depicts incrementing a first counter associated with the first control logic. As previously described, a token may be passed between the master controller logic 101, first TRIAC controller logic 102A and the second TRIAC controller logic 102B thereby dictating which controller is authorized to enable its associated TRIAC 103. This token may be implemented in the form of a token counter maintained by each of the master controller logic 101, first TRIAC controller logic 102A and the second TRIAC controller logic 102B. For example, as shown in FIG. 1, the master controller logic 101 may include a token counter 107, first TRIAC controller logic 102A may include a token counter 108A, and the second TRIAC controller logic 102B may include a token counter 108B. Upon receipt of the token counter value from another controller, the receiving controller may increment that counter and store it to its own local counter. For example, as shown in FIG. 1, when the token is transferred from the master controller logic 101 to the first TRIAC controller logic 102A, the value maintained by the token counter 107 (e.g. 0000) may be passed to the first TRIAC controller logic 102A via token/data path 105A, incremented by the first TRIAC controller logic 102A (e.g. 0001) and stored in the token counter 108A. In such a configuration, the token counter 108 having the highest value indicates the controller 102 currently possesses the token and is thereby authorized to enable its TRIAC 103 to restore the associated current/voltage source 101.

Figure 4:
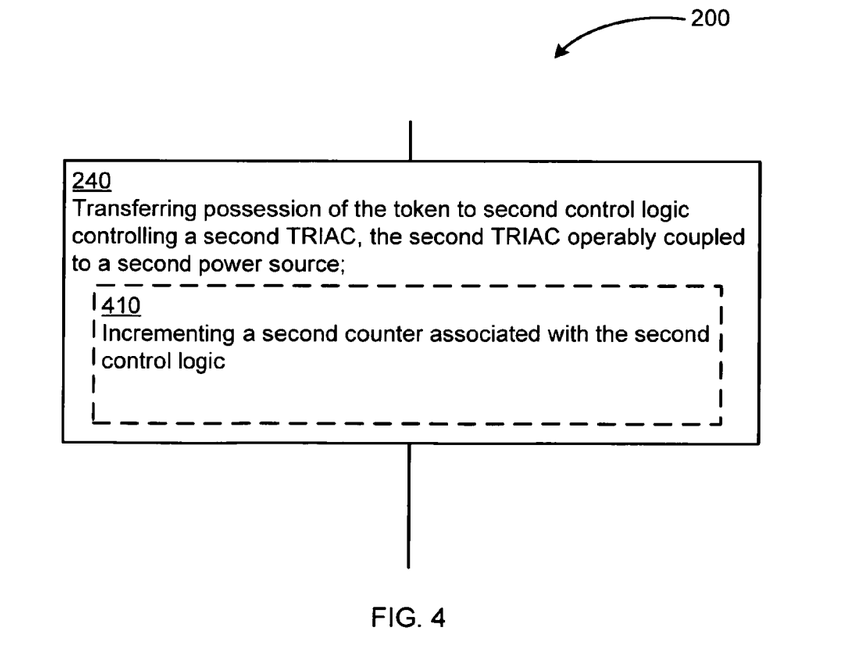
FIG. 4 illustrates operations of a method for high-reliability power switching.

Similarly, referring to FIG. 4, operation 240 of operational flow 200 may include one or more additional operations, such as operation 410. Operation 410 depicts incrementing a second counter associated with the second control logic. For example, as shown in FIG. 1, when the token is transferred from the first TRIAC controller logic 102A to the second TRIAC controller logic 102B, the value maintained by the token counter 108A (e.g. 0001) may be passed to the second TRIAC controller logic 102B via token/data path 106, incremented by the second TRIAC controller logic 102B (e.g. 0002) and stored in the token counter 108B. As previously stated, the token counter 108 having the highest value indicates the controller 102 currently possesses the token and is thereby authorized to enable its TRIAC 103.

Figure 5:
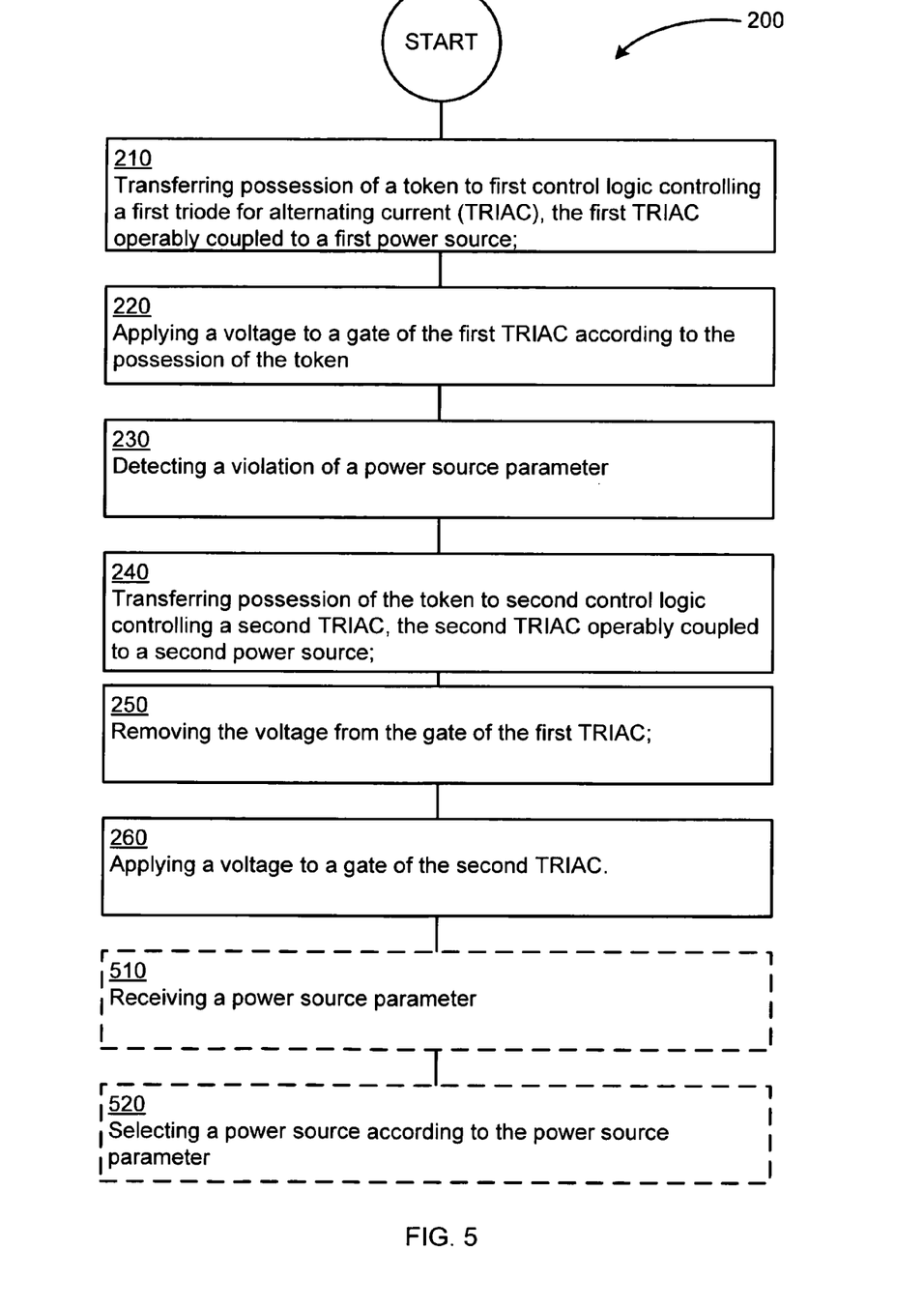
FIG. 5 illustrates operations of a method for high-reliability power switching.

Referring to FIG. 5, operational flow 200 may include one or more additional operations, such as operations 510 and 520. Operation 510 depicts receiving a power source parameter. For example, referring to FIG. 1, the master controller logic 101 may receive a power source parameter from user 110 via user interface 109. The user may provide power configuration settings particular to the load 104 such as a desired voltage, current, frequency and/or phase of a power source supplying the load 104.

Operation 520 depicts selecting a power source according to the power source parameter. For example, referring to FIG. 1, upon receiving a power source parameter, the master controller logic 101 may compare the power source parameter to the electrical properties 111 of the first current/voltage source 101A and the second current/voltage source 101B to determine which power source 101 has properties most closely correlating with the power source parameter(s). That power source may be selected to provide power to the load 104. Once a power source 101 has been selected, the master controller logic 101 may transfer the token to the TRIAC controller logic 102 associated with the TRIAC 103 regulating that power source 101 in order to provide power to the load 104.

Figure 6:
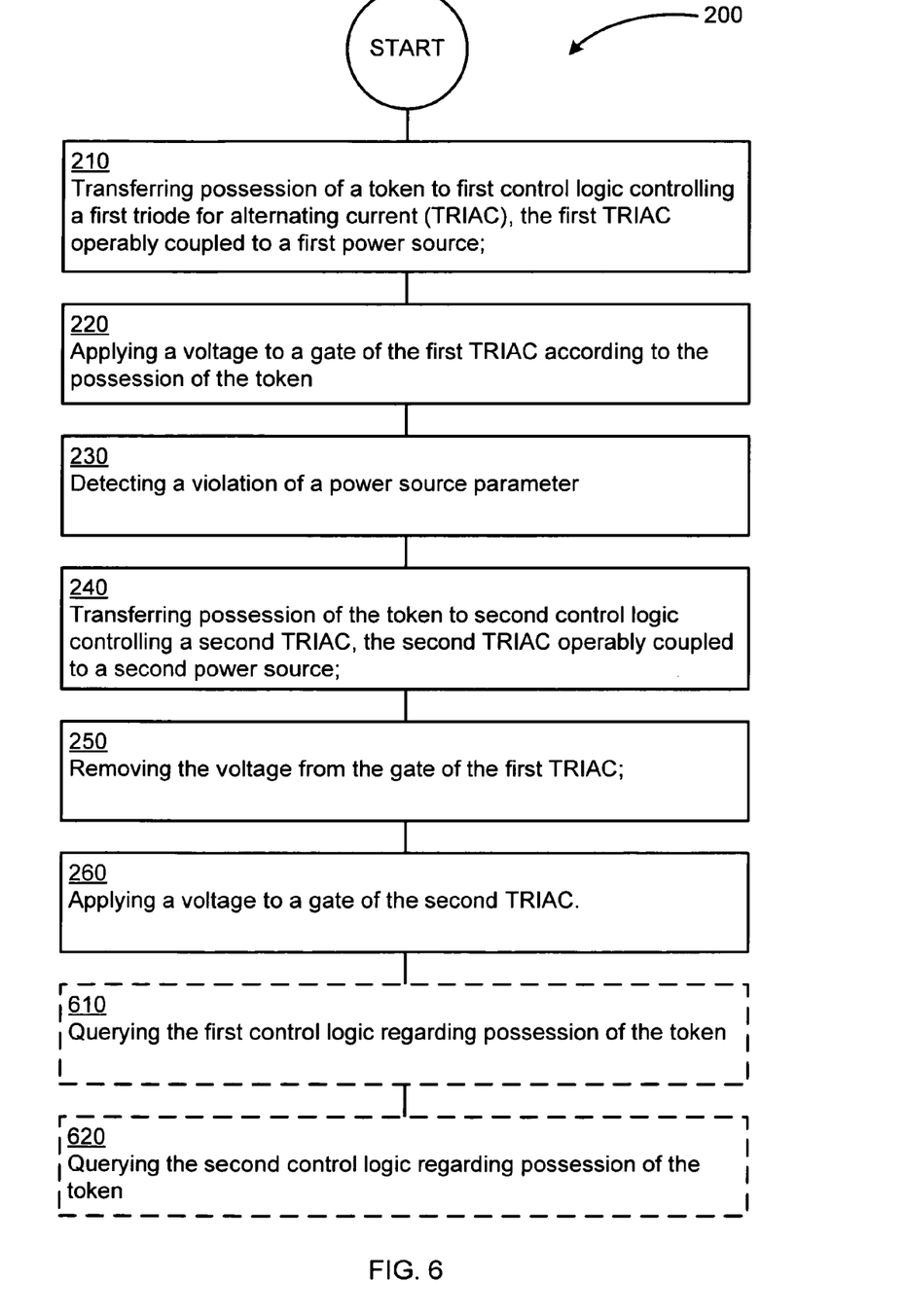
FIG. 6 illustrates operations of a method for high-reliability power switching.

Referring to FIG. 6, operational flow 200 may include one or more additional operations, such as operations 610 and 620. Operation 610 depicts querying the first control logic regarding possession of the token. Operation 620 depicts querying the second control logic regarding possession of the token. For example, as shown in FIG. 1, the master controller logic 101 may query the first TRIAC controller logic 102A and/or the second TRIAC controller logic 102B to confirm that the token is being properly passed between the first TRIAC controller logic 102A and the second TRIAC controller logic 102B. In cases where faults in the TRAIC controller logic 102 or data corruption have resulted in duplicate or anomalous tokens, the master controller logic 101 may detect such faults through querying operations 610 and 620 and may reinitialize the power switching system 100 to a known state by transferring a new verified token to the TRIAC controller logic 102 which most recently possessed the token.

Figure 7:
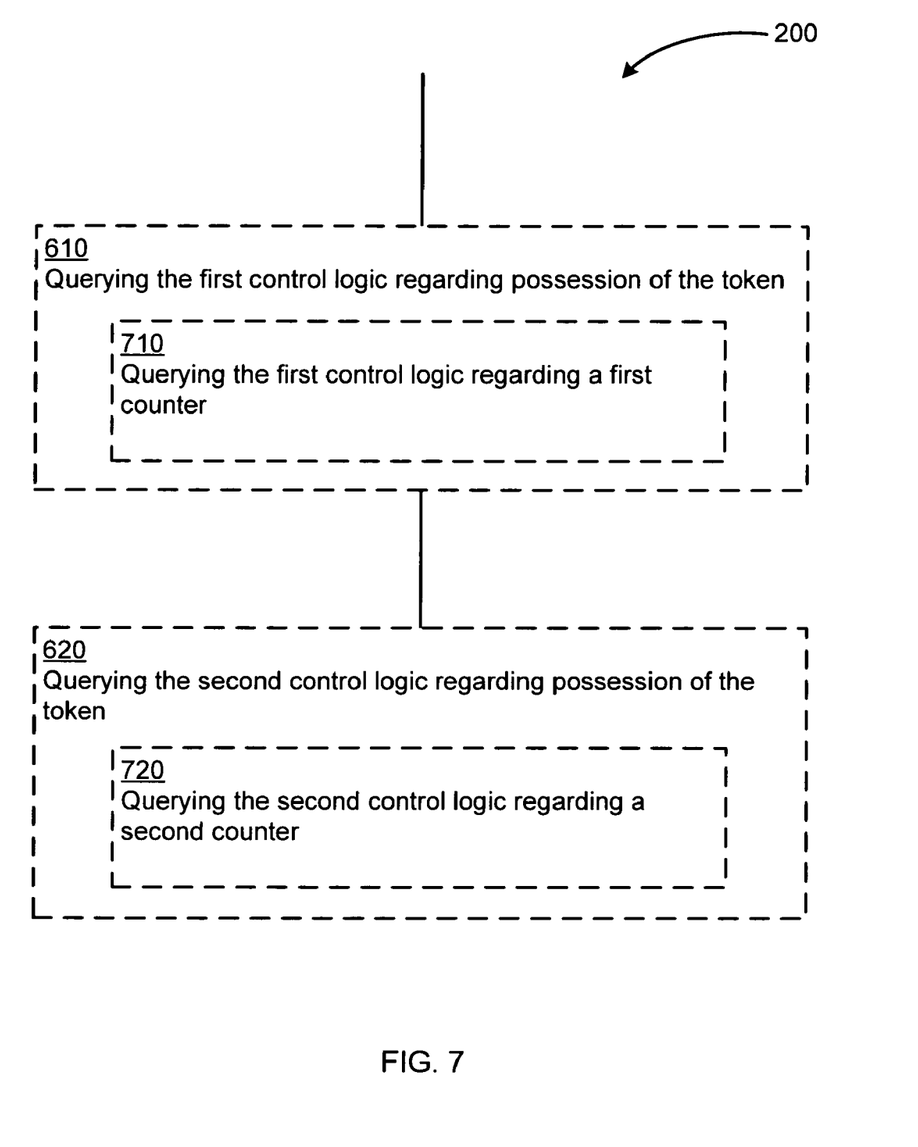
FIG. 7 illustrates operations of a method for high-reliability power switching.

Referring to FIG. 7, operations 610 and 620 may include at least one additional operation such as operations 710 and 720, respectively. Operation 710 depicts querying the first control logic regarding a first counter. Operation 720 depicts querying the second control logic regarding a second counter. As presented above, the token may be represented by incremental counters maintained by the various controllers. These counters may be queried by the master controller logic 101. For example, as shown in FIG. 1, the master controller logic 101 may query the token counter 108A of the first TRIAC controller logic 102A and/or the token counter 108B of the second TRIAC controller logic 102B to confirm that the token counters are being properly incremented when the token is passed between the first TRIAC controller logic 102A and the second TRIAC controller logic 102B. In cases where faults in the TRAIC controller logic 102 or data corruption have resulted in duplicate or anomalous tokens, the master controller logic 101 may detect such faults through querying operations 610 and 620 and may reinitialize the power switching system 100 to a known state by transferring a new verified token to the TRIAC controller logic 102 having the highest current token counter 108 value.

Figure 8:
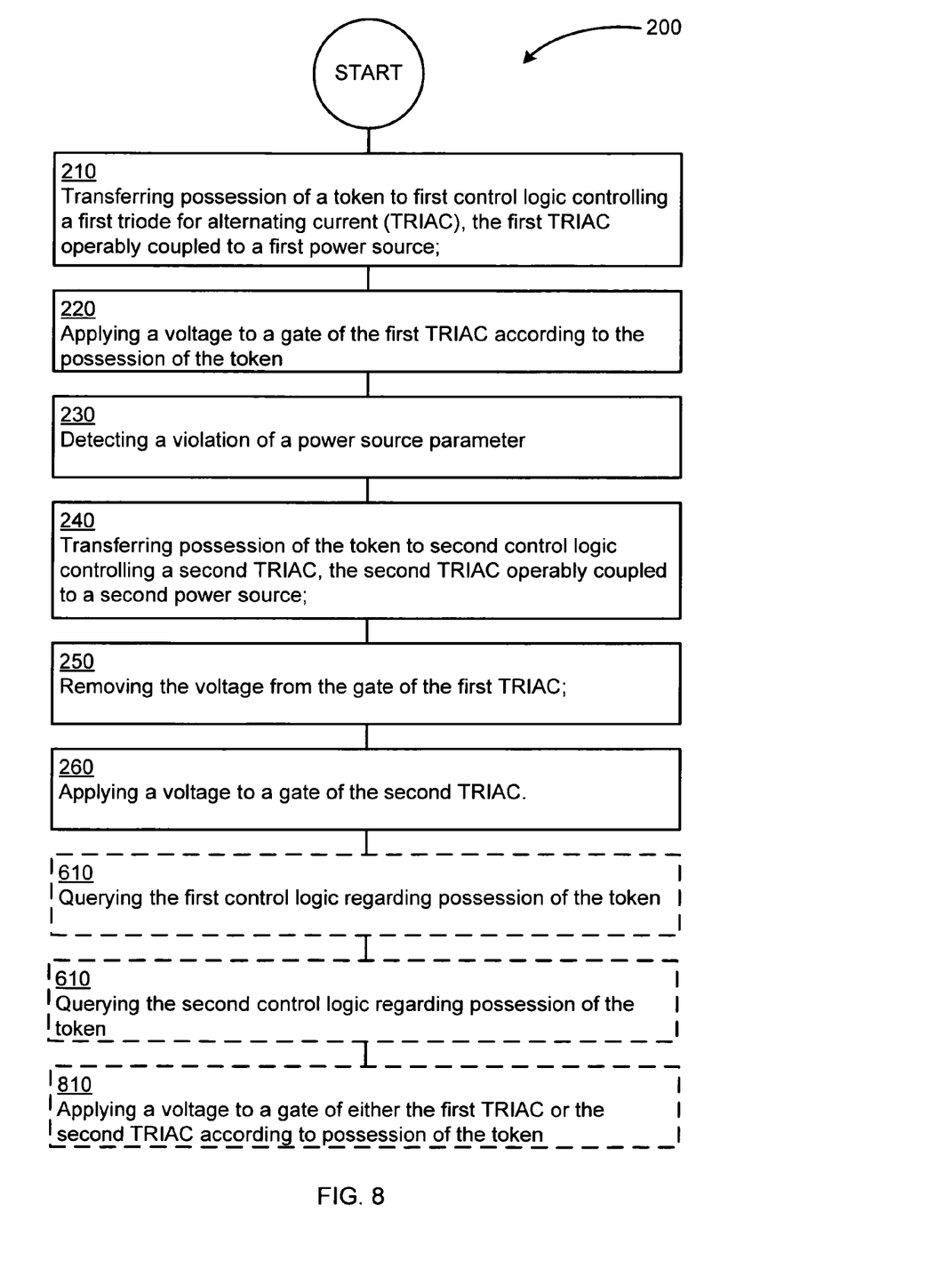
FIG. 8 illustrates operations of a method for high-reliability power switching.

Referring to FIG. 8, operational flow 200 may include at least one additional operation, such as operation 810. Operation 810 depicts applying a voltage to a gate of either the first TRIAC or the second TRIAC according to possession of the token. For example, as shown in FIG. 1, upon querying of operation 610 and 620 and detection of the most recent token holder, the TRIAC controller logic 102 which receives a new verified token may enable its associated TRIAC 103 by providing a voltage to the gate signal 114 of that TRIAC.

Figure 9:
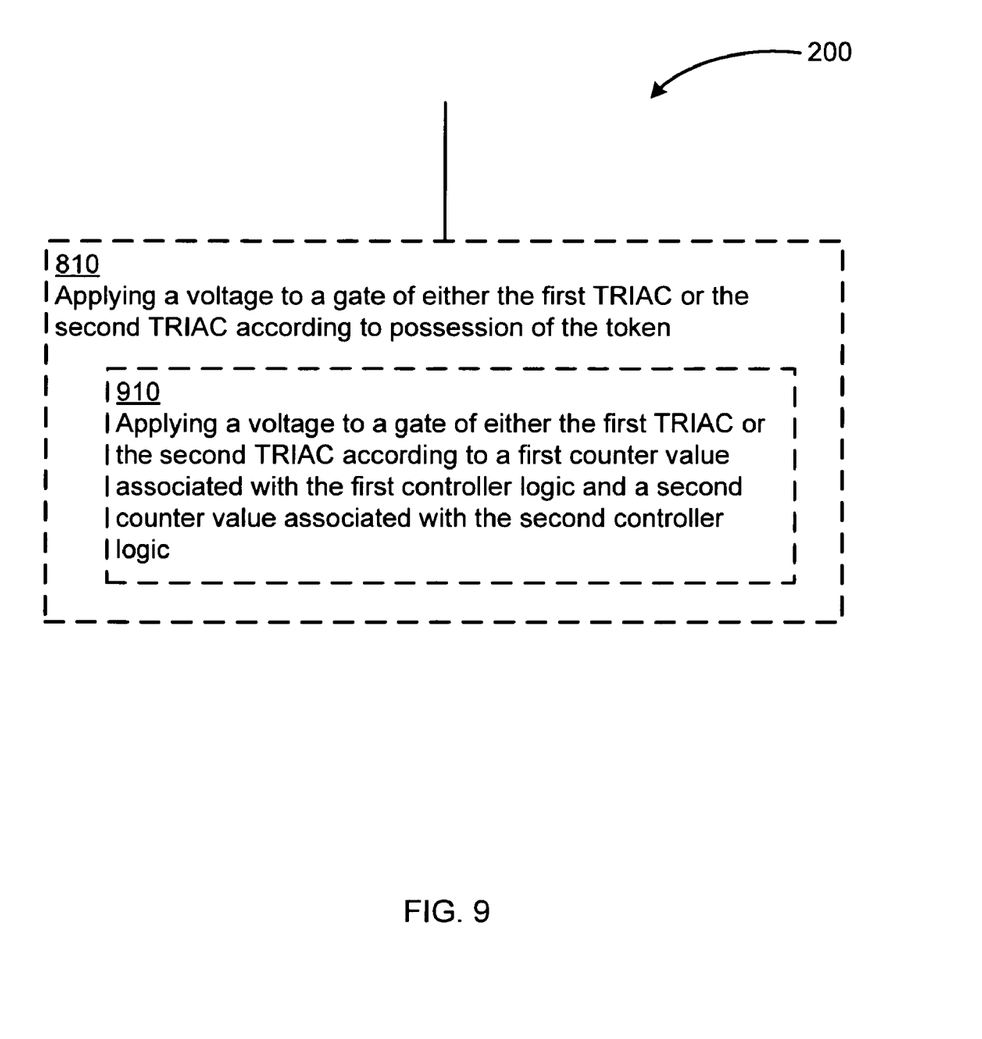
FIG. 9 illustrates operations of a method for high-reliability power switching.

Referring to FIG. 9, operation 810 of operational flow 200 may include at least one additional operation, such as operation 910. Operation 910 depicts applying a voltage to a gate of either the first TRIAC or the second TRIAC according to a first counter value associated with the first controller logic and a second counter value associated with the second controller logic. For example, as shown in FIG. 1, upon querying of operation 610 and 620 and detection of the most recent token holder, the TRIAC controller logic 102 which receives a new verified token through incrementation of its token counter 108 may enable its associated TRIAC 103 by providing a voltage to the gate signal 114 of that TRIAC.

Figure 10:
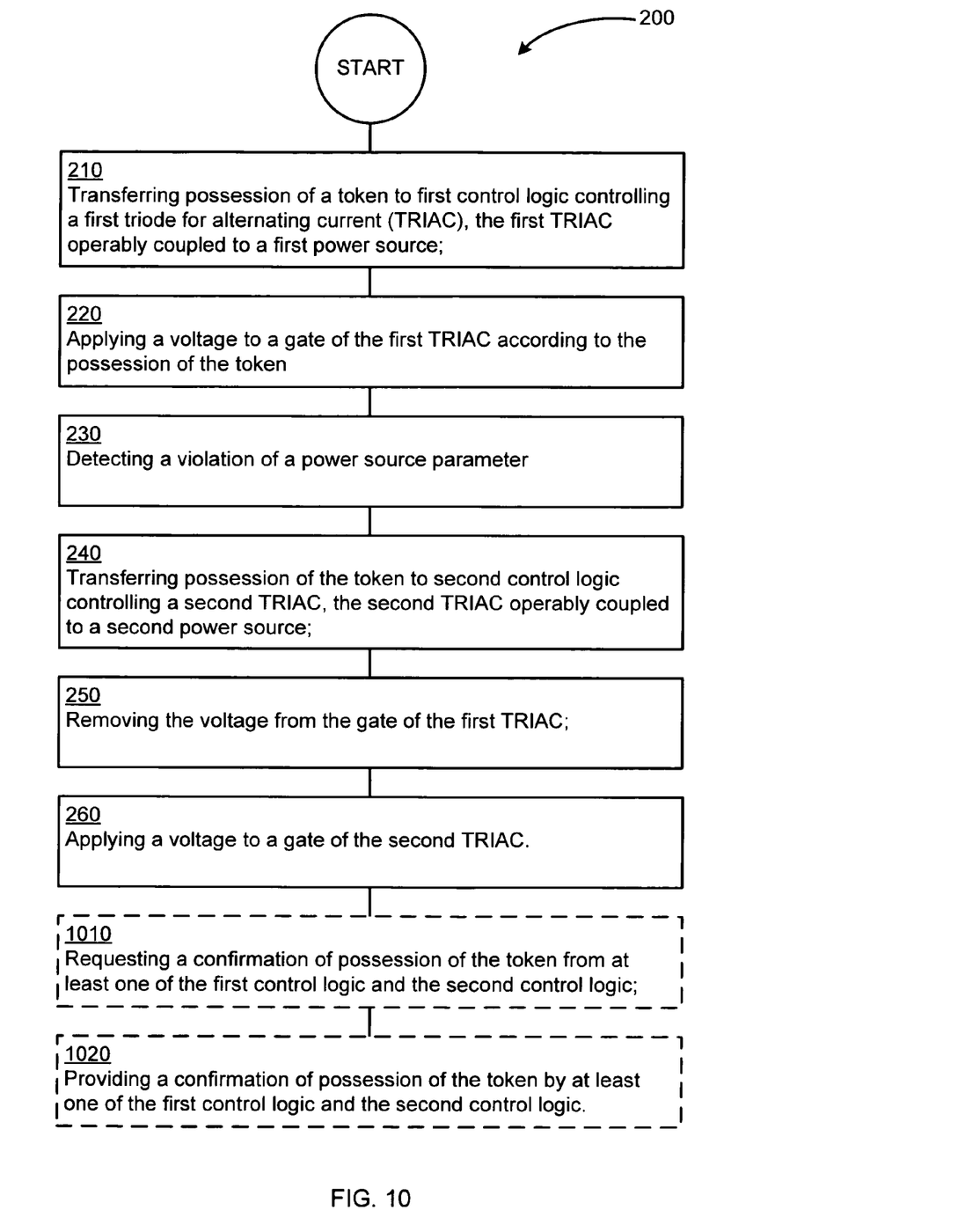
FIG. 10 illustrates operations of a method for high-reliability power switching.

Referring to FIG. 10, operational flow 200 may include at least one additional operation, such as operations 1010 and 1020. Operation 1010 depicts requesting a confirmation of possession of the token from at least one of the first control logic and the second control logic. For example, as shown in FIG. 1, the first TRIAC controller logic 102A may request a confirmation from the second TRIAC controller logic 102B that it is currently in possession of the token. Such requests may occur at given time intervals (e.g. 1000 requests per second) or at particularly scheduled times (e.g. startup, on transfer of the token, etc.)

Operation 1020 depicts providing a confirmation of possession of the token by at least one of the first control logic and the second control logic. For example, upon receiving a request for confirmation of possession of the token, the second TRIAC controller logic 102B may provide a confirmation to the first TRIAC controller logic 102A that it is currently in possession of the token.

Figure 11:
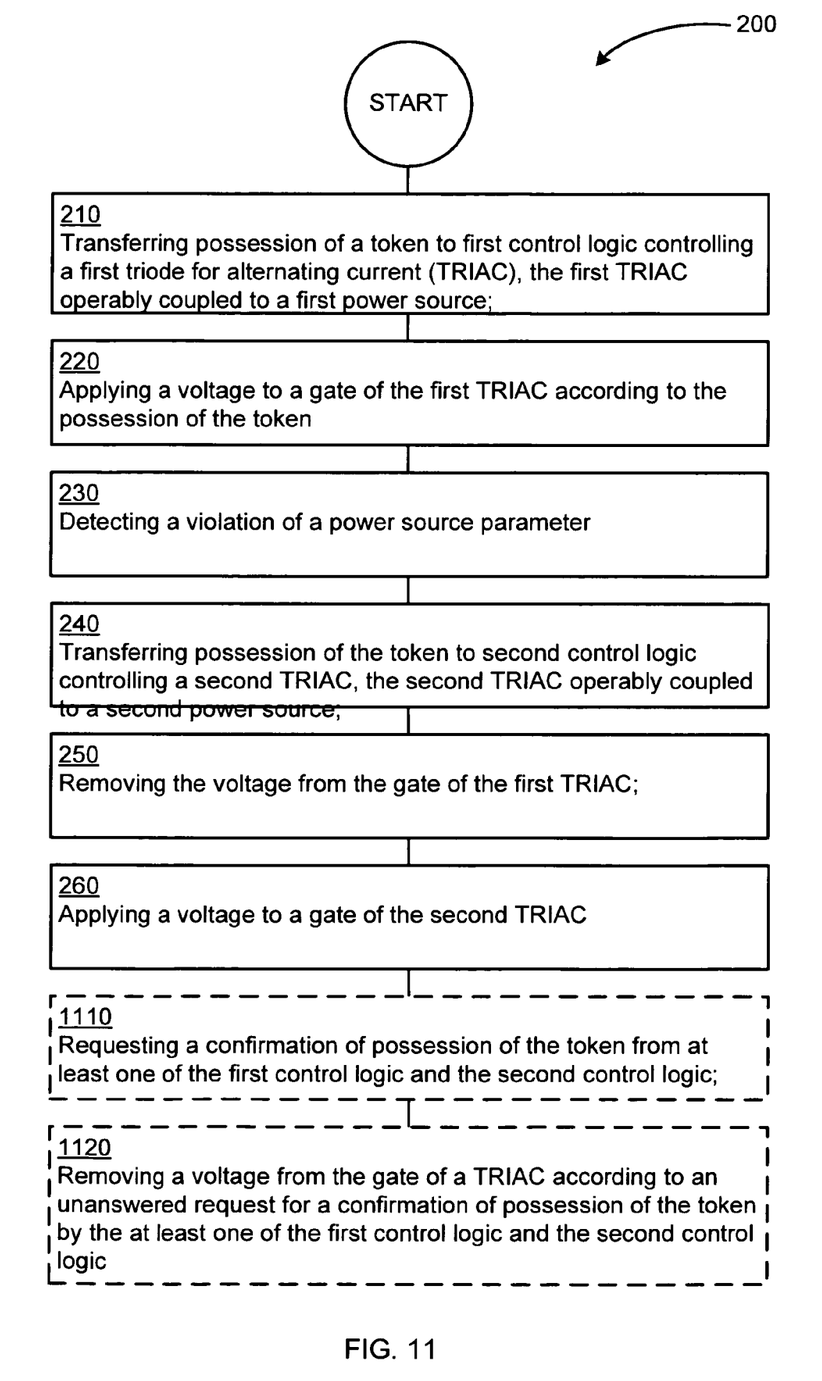
FIG. 11 illustrates operations of a method for high-reliability power switching.

Referring to FIG. 11, operational flow 200 may include at least one additional operation, such as operations 1110 and 1120. Operation 1110 depicts requesting a confirmation of possession of the token from at least one of the first control logic and the second control logic. For example, as shown in FIG. 1, the first TRIAC controller logic 102A may request a confirmation from the second TRIAC controller logic 102B that it is currently in possession of the token.

Operation 1120 depicts removing a voltage from the gate of a TRIAC according to an unanswered request for a confirmation of possession of the token by the at least one of the first control logic and the second control logic. For example, referring to FIG. 1, it may be the case that either the first TRIAC controller logic 102A or the second TRIAC controller logic 102B (which currently has possession of the token) has suffered a failure and is no longer capable of monitoring its respective current/voltage source 101 or controlling its associated TRIAC 103 or recognize that it is in possession of the token. As such, the remaining functional TRIAC controller logic 102 may initiate a unilateral disabling of the TRIAC 103 of the non-functional TRIAC controller logic 102. For example, the functional TRIAC controller logic 102 may enable an interlock 111 operably coupled to the gate signal 104 of the non-functional TRIAC controller logic 102 thereby removing the voltage from the TRIAC 103 associated with the non-functional TRIAC controller logic 102.

Figure 12:
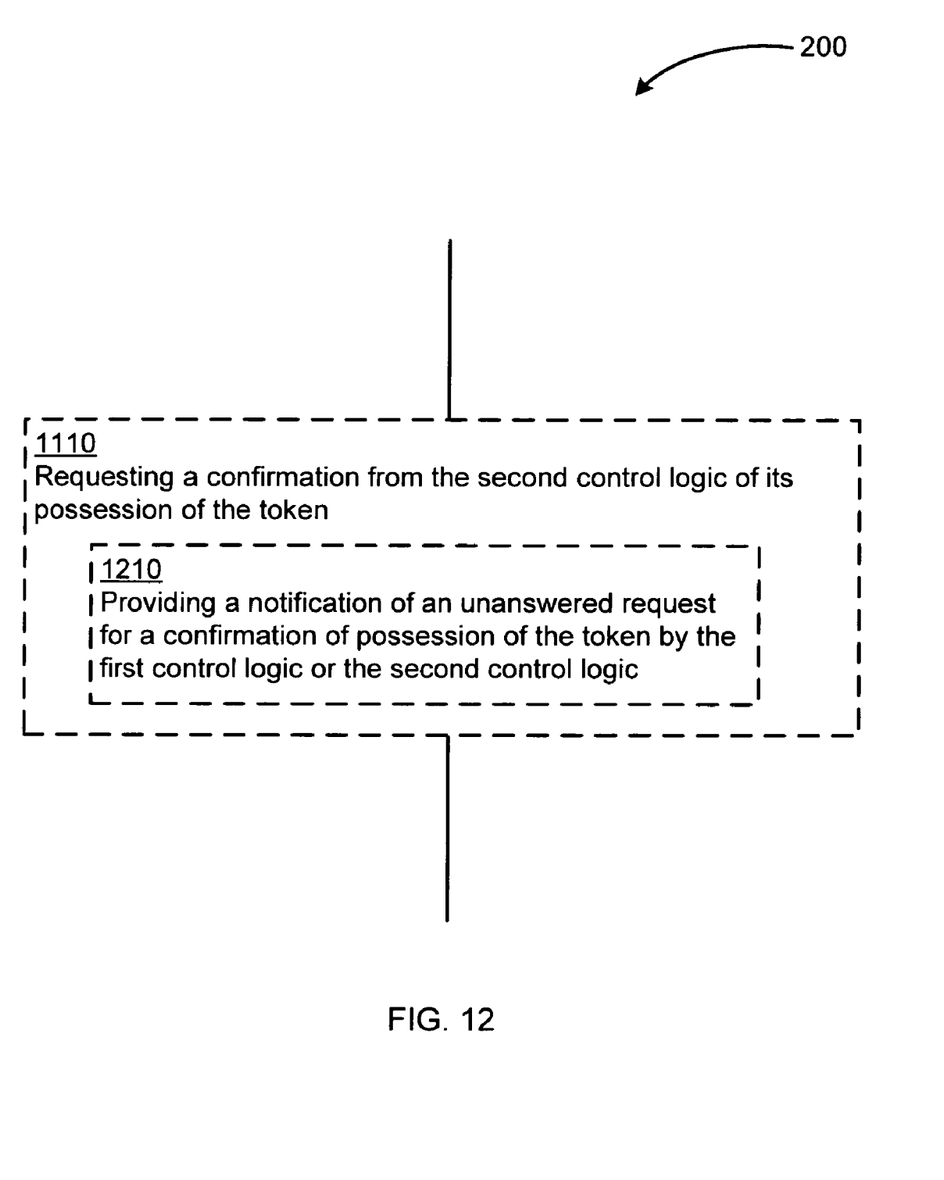
FIG. 12 illustrates operations of a method for high-reliability power switching.

Referring to FIG. 12, operation 1110 of operational flow 200 may include at least one additional operation, such as operation 1210. Operation 1210 depicts providing a notification of an unanswered request for a confirmation of possession of the token by the first control logic or the second control logic. For example, as shown in FIG. 1, a functional TRIAC controller logic 102 that has detected another TRIAC controller logic 102 is failing to respond to a request for confirmation of possession of the token may provide a notification to a user 110 via the master controller logic 101 and the associated user interface 109 that a the non-functional TRIAC controller logic 102 is non-responsive. For example, the user 110 may be provided a visual notification via a display, an e-mail or text message notification, an audible notification via a speaker system, or any other notification mechanism.

Figure 13:
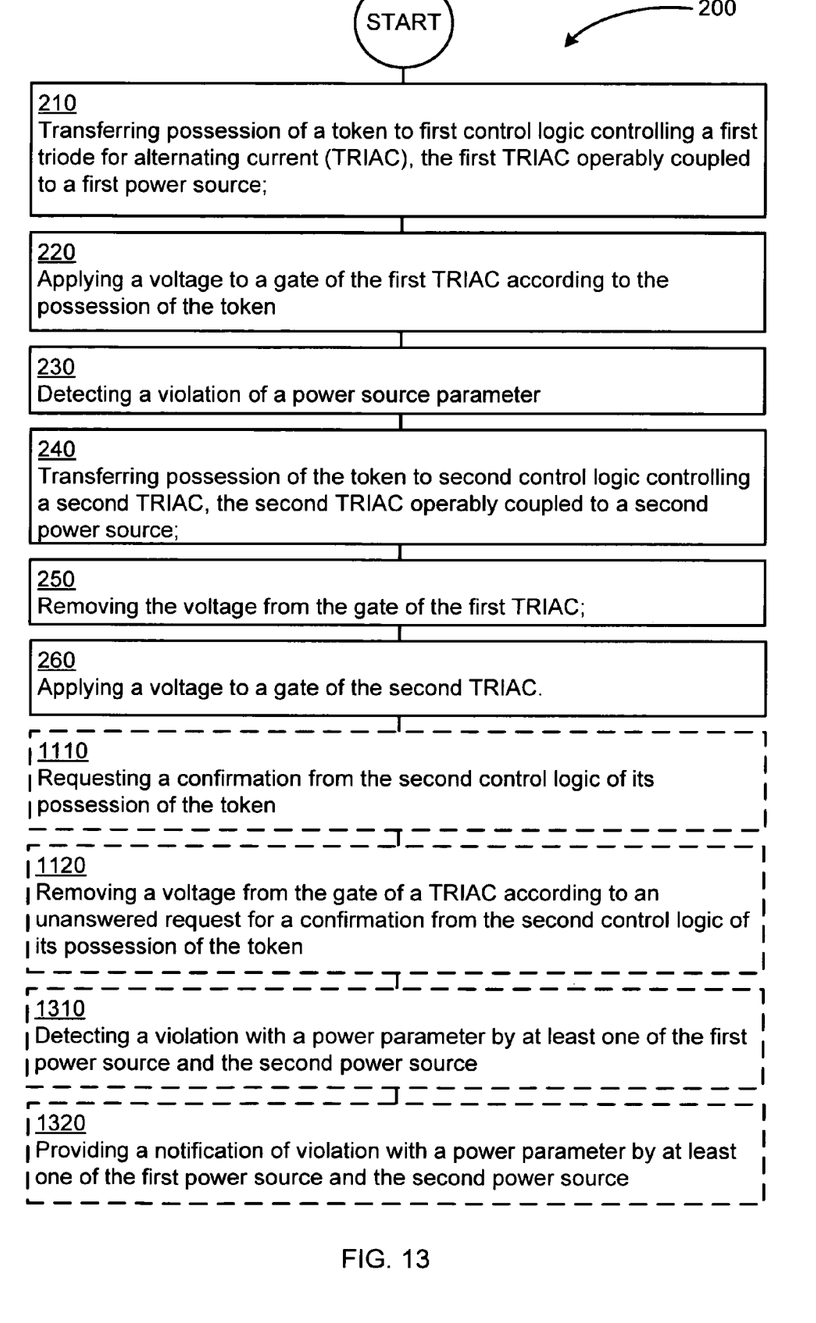
FIG. 13 illustrates operations of a method for high-reliability power switching.

Referring to FIG. 13, operational flow 200 may include at least one additional operation, such as operations 1110 (as presented above), 1120 (as presented above), 1310 and 1320. Operation 1310 depicts detecting a violation with a power parameter by at least one of the first power source and the second power source. For example, as shown in FIG. 1, upon detection of non-functional TRIAC controller logic 102, a functional TRIAC controller logic 102 may compare the electrical properties of its associated current/voltage source 101 to a power source parameter provided by the master controller logic 101 in order determine if it is a viable power source for the load 104. If the functional TRIAC controller 102 determines that it violates one or more power source parameters, no action may be taken. Operation 1320 depicts providing a notification of violation with a power parameter by at least one of the first power source and the second power source. For example, the user 110 may be provided a visual notification via a display, an e-mail or text message notification, an audible notification via a speaker system, or any other notification mechanism.

Figure 14:
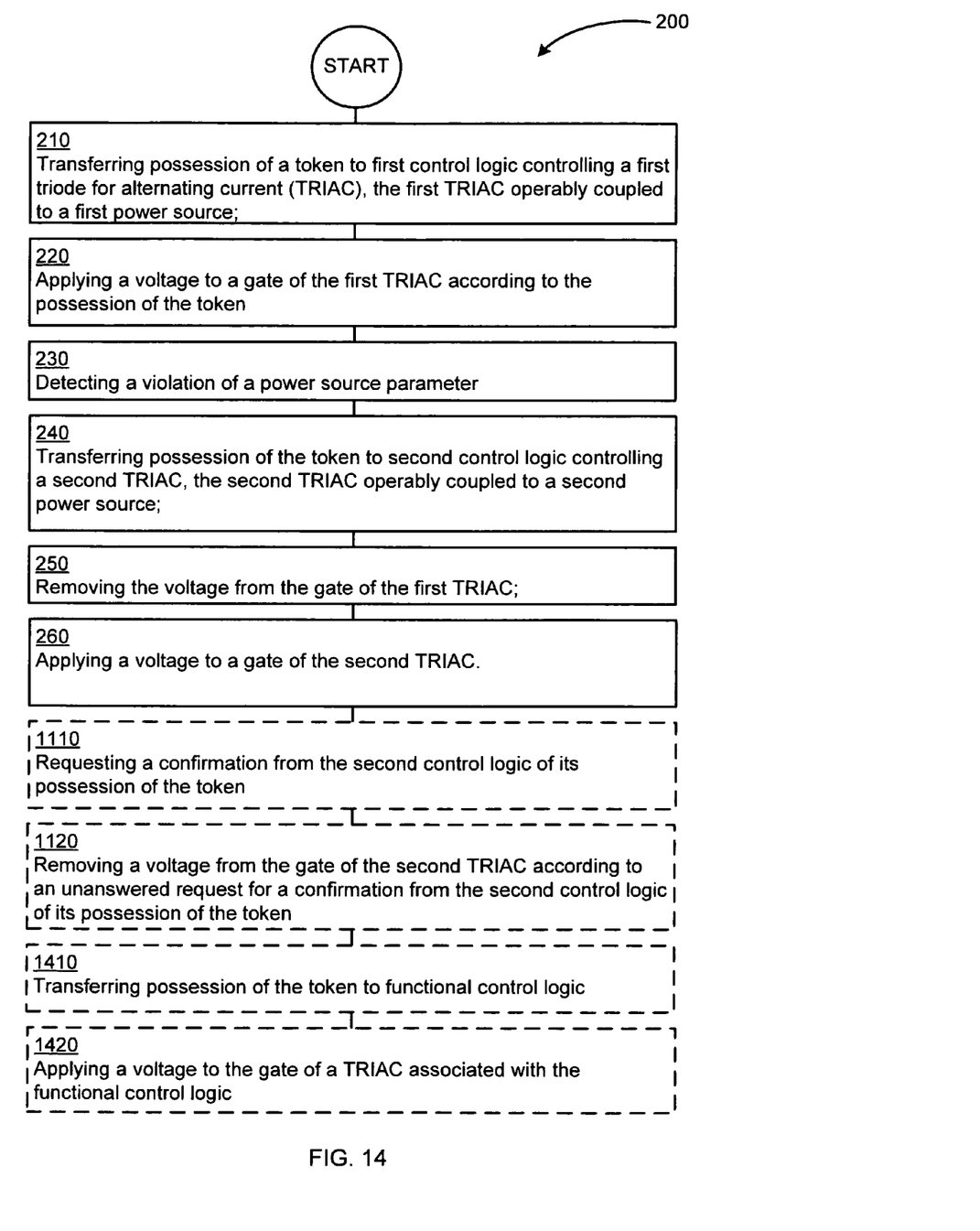
FIG. 14 illustrates operations of a method for high-reliability power switching.

Referring to FIG. 14, operational flow 200 may include at least one additional operation, such as operations 1110 (as presented above), 1120 (as presented above), 1410 and 1420. Operation 1410 depicts transferring possession of the token to functional control logic. For example, as shown in FIG. 1, upon detection of a non-functional TRIAC controller logic 102, a functional TRIAC controller logic 102 may compare the electrical properties of its associated current/voltage source 101 to a power source parameter provided by the master controller logic 101 in order determine if it is a viable power source for the load 104. If the functional TRIAC controller 102 determines that its current/voltage source 101 complies with the power source parameters, the functional TRIAC controller logic 102 may then obtain the token from the non-functional TRIAC controller logic 102.

Operation 1420 depicts applying a voltage to the gate of a TRIAC associated with the functional control logic. For example, referring to FIG. 1, upon transfer of the token from a non-functional TRIAC controller logic 102 to a functional TRIAC controller logic, the functional TRIAC controller logic may apply a voltage to the gate signal 104 in order to enable its associated TRIAC.

Figure 15:
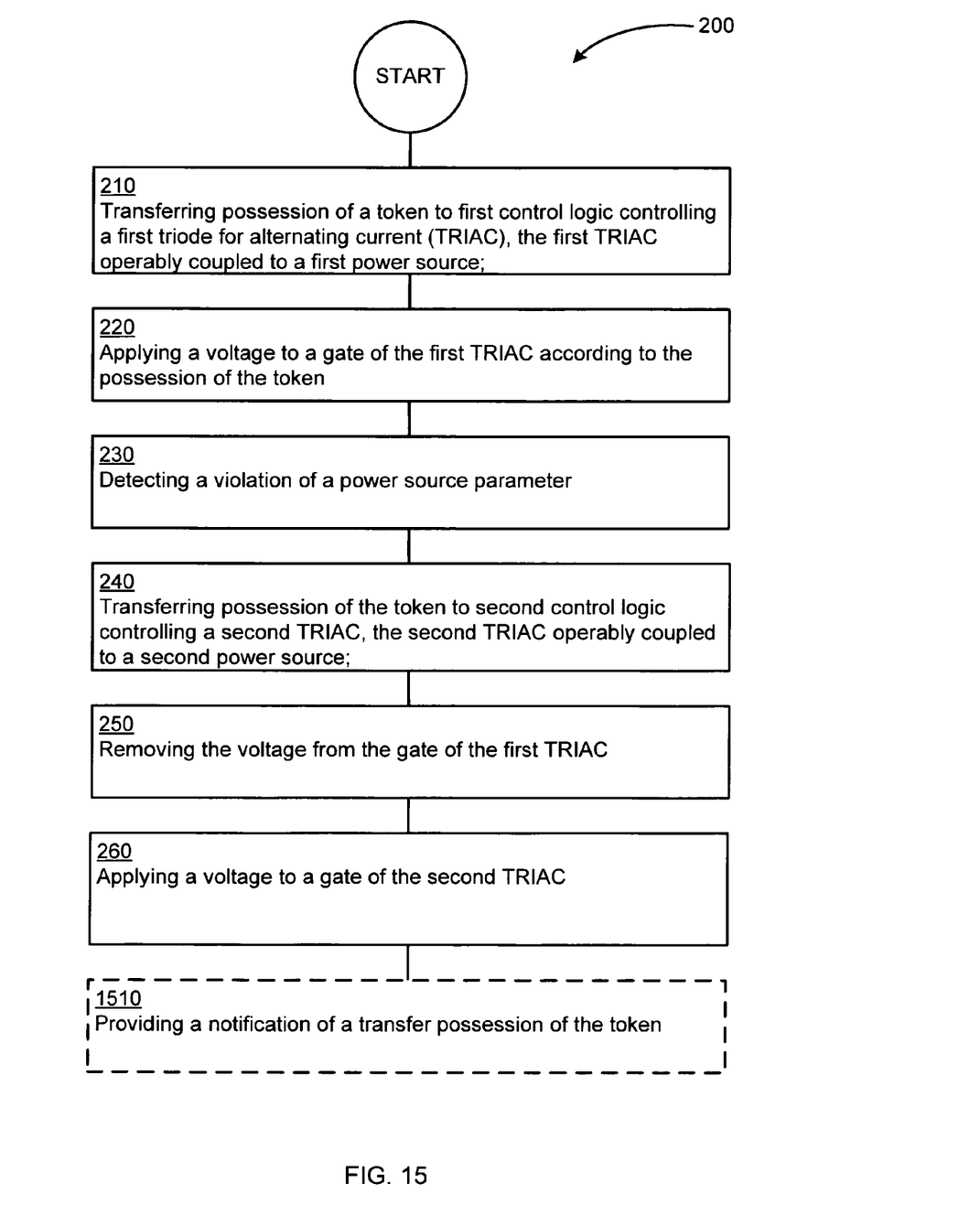
FIG. 15 illustrates operations of a method for high-reliability power switching.

Referring to FIG. 15, operational flow 200 may include at least one additional operation, such as operation 1510. Operation 1510 depicts providing a notification of a transfer of possession of the token. For example, referring to FIG. 1, when the token is transferred between the first TRIAC controller logic 102A and the second TRIAC controller logic 102B, the user 110 may be provided a visual notification via a display, an e-mail or text message notification, an audible notification via a speaker system, or any other notification mechanism.

It should be noted that many functions have been attributed to respective controller logic. However, such recitations are for descriptive purposes only and one skilled in the art will recognize that the various operations may be allocated to or implemented with one or more controller logic in an integrated or distributed manner without departing from the scope of the descriptions herein.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

What is claimed is:

1. A method for high-reliability power switching, the method comprising:
    transferring possession of a token to first control logic controlling a first triode for alternating current (TRIAC), the first TRIAC operably coupled to a first power source;
    applying a voltage to a gate of the first TRIAC according to the possession of the token;
    detecting a violation of a power source parameter;
    transferring possession of the token to second control logic controlling a second TRIAC, the second TRIAC operably coupled to a second power source;
    removing the voltage from the gate of the first TRIAC; and
    applying a voltage to a gate of the second TRIAC.

2. The method of claim 1, wherein the transferring possession of a token to first control logic controlling a first TRIAC operably coupled to a first power source further comprises:
    incrementing a first counter associated with the first control logic.

3. The method of claim 1, wherein the transferring possession of the token to second control logic controlling a second TRIAC, the second TRIAC operably coupled to a second power source further comprises:
    incrementing a second counter associated with the second control logic.

4. The method of claim 1, further comprising:
    receiving a power source parameter.

5. The method of claim 4, further comprising:
    selecting a power source according to the power source parameter.

6. The method of claim 1, further comprising:
    querying the first control logic regarding possession of the token; and
    querying the second control logic regarding possession of the token.

7. The method of claim 6, wherein the querying the first control logic regarding possession of the token further comprises:
    querying the first control logic regarding a first counter.

8. The method of claim 6, wherein the querying the second control logic regarding possession of the token further comprises:
    querying the second control logic regarding a second counter.

9. The method of claim 6, further comprising:
    applying a voltage to a gate of either the first TRIAC or the second TRIAC according to possession of the token.

10. The method of claim 9, wherein the applying a voltage to a gate of either the first TRIAC or the second TRIAC according to possession of the token further comprises:
    applying a voltage to a gate of either the first TRIAC or the second TRIAC according to a first counter value associated with the first controller logic and a second counter value associated with the second controller logic.

11. The method of claim 1, further comprising:
    requesting a confirmation of possession of the token from at least one of the first control logic and the second control logic; and
    providing a confirmation of possession of the token by at least one of the first control logic and the second control logic.

12. The method of claim 1, further comprising:
    requesting a confirmation of possession of the token from at least one of the first control logic and the second control logic; and
    removing a voltage from the gate of a TRIAC according to an unanswered request for a confirmation of possession of the token by the at least one of the first control logic and the second control logic.

13. The method of claim 12, further comprising:
    providing a notification of an unanswered request for a confirmation of possession of the token by the first control logic or the second control logic.

14. The method of claim 12, further comprising:
    detecting a violation with a power parameter by at least one of the first power source and the second power source.

15. The method of claim 14, further comprising:
    providing a notification of violation with a power parameter by at least one of the first power source and the second power source.

16. The method of claim 12, further comprising:
    transferring possession of the token to functional control logic; and
    applying a voltage to the gate of a TRIAC associated with the functional control logic.

17. The method of claim 1, further comprising:
    providing a notification of a transfer of possession of the token.

18. A system for high-reliability power switching, the system comprising:
    means for transferring possession of a token to first control logic controlling a first triode for alternating current (TRIAC), the TRIAC operably coupled to a first power source;
    means for applying a voltage to a gate of the first TRIAC according to the possession of the token;
    means for detecting a violation of a power source parameter;
    means for transferring possession of the token to second control logic controlling a second TRIAC, the second TRIAC operably coupled to a second power source;
    means for removing the voltage from the gate of the first TRIAC; and
    means for applying a voltage to a gate of the second TRIAC.

19. A system for high-reliability power switching, the system comprising:
    first controller logic controlling a first triode for alternating current (TRIAC), the TRIAC operably coupled to a first power source, the first controller logic including a first token counter;
    second controller logic controlling a second TRIAC, the second TRIAC operably coupled to a second power source, the second controller logic including a second token counter; and
    master control logic operably coupled to a user interface, the first controller logic and the second controller,
    wherein the first controller logic and the second controller logic are configured for applying a voltage to either a gate of the first TRIAC or a gate of the second TRIAC according to a comparison between the first token counter and the second token counter.

* * * * *